US011356433B2

(12) United States Patent
Krylov et al.

(10) Patent No.: US 11,356,433 B2
(45) Date of Patent: Jun. 7, 2022

(54) SYSTEM AND METHOD FOR DETECTING UNAUTHORIZED ACTIVITY AT AN ELECTRONIC DEVICE

(71) Applicant: Group IB, Ltd, Moscow (RU)

(72) Inventors: Pavel Vladimirovich Krylov, Moscow (RU); Aleksandr Viktorovich Batenev, Pushkino district (RU)

(73) Assignee: GROUP IB, LTD, Moscow (RU)

( * ) Notice: Subject to any disclaimer, the term of this patent is extended or adjusted under 35 U.S.C. 154(b) by 36 days.

(21) Appl. No.: 17/148,954

(22) Filed: Jan. 14, 2021

(65) Prior Publication Data
US 2021/0344661 A1 Nov. 4, 2021

(30) Foreign Application Priority Data

Apr. 30, 2020 (RU) .......................... RU2020115831

(51) Int. Cl.
*H04L 29/06* (2006.01)
*H04L 9/06* (2006.01)
(Continued)

(52) U.S. Cl.
CPC ............ *H04L 63/08* (2013.01); *G06F 21/128* (2013.01); *G06F 21/44* (2013.01); *H04L 9/06* (2013.01);
(Continued)

(58) Field of Classification Search
CPC . H04L 67/10; H04L 67/02; H04L 9/06; H04L 63/08; H04L 63/0281; H04L 63/0428; G06F 21/44; G06F 21/128
See application file for complete search history.

(56) References Cited

U.S. PATENT DOCUMENTS 9,420,049 B1 8/2016 Talmor et al.
9,906,514 B1 2/2018 Podemsky
(Continued)

FOREIGN PATENT DOCUMENTS

EP 2383671 A1 11/2011
RU 2015132628 A 2/2017

OTHER PUBLICATIONS

Introducing reCaptcha v3: The New Way to Stop Bots—Google Search Central, Oct. 29, 2018 https://developers.google.com/search/blog/2018/10/introducing-recaptcha-v3-new-way-to (Year: 2018).*
(Continued)

*Primary Examiner* — Randy A Scott
(74) *Attorney, Agent, or Firm* — BCF LLP

(57) ABSTRACT

A method and a system for detecting an unauthorized activity at a user device are provided. The method comprises: analyzing a first request from the user device, the first request including original client cookie; in response to the original client cookie meeting a predetermined threshold: causing the user device to receive a Java Script Module, thereby enabling the user device to generate a second request, by: receiving server cookie indicative of a given activity associated with the user device being one of: a user activity and a bot activity; generating the second request including first client cookie and the server cookie; determining if the second request is to be transmitted to a web content server associated with the first web page; in response to the server cookie data being indicative of the bot activity: the second request is blocked.

27 Claims, 4 Drawing Sheets

(51) Int. Cl.
  *H04L 29/08*    (2006.01)
  *G06F 21/12*    (2013.01)
  *G06F 21/44*    (2013.01)
  *H04L 9/40*     (2022.01)
  *H04L 67/02*    (2022.01)
  *H04L 67/10*    (2022.01)
  *H04L 67/56*    (2022.01)

(52) U.S. Cl.
  CPC ...... *H04L 63/0281* (2013.01); *H04L 63/0428* (2013.01); *H04L 67/02* (2013.01); *H04L 67/10* (2013.01); *H04L 67/28* (2013.01)

(56) References Cited

U.S. PATENT DOCUMENTS

| | | | |
|---|---|---|---|
| 10,097,583 B1 * | 10/2018 | Demirjian | ............... H04L 63/08 |
| 10,270,792 B1 | 4/2019 | Shemesh | |
| 10,326,789 B1 | 6/2019 | Vines et al. | |
| 2008/0004921 A1 * | 1/2008 | Orttung | .................. G06Q 50/14 705/6 |
| 2010/0070620 A1 | 3/2010 | Awadallah et al. | |

OTHER PUBLICATIONS

"Scraper Bots and the Secret Internet Arms Race"—Klint Finleyl, Wired, Jul. 23, 2018 https://www.wired.com/story/scraper-bots-and-the-secret-internet-arms-race/ (Year: 2018).*

Grant Decision and Search Report with regard to the RU Patent Application No. 2020115831 completed Nov. 10, 2020.

English Abstract for RU2015132628 retrieved on Espacenet on Jan. 13, 2021.

"What is scraping: How Amazon, Walmart and other retailers use bots to fight competitors", hightech.fm/2018/08/02/scraper, pdf 10 pages (including English Abstract retrieved on Yandex.Translate on Jan. 13, 2021).

\* cited by examiner

SYSTEM AND METHOD FOR DETECTING UNAUTHORIZED ACTIVITY AT AN ELECTRONIC DEVICE

CROSS-REFERENCE

The present application claims priority to Russian Patent Application No. 2020115831, entitled "SYSTEM AND METHOD FOR DETECTING UNAUTHORIZED ACTIVITY AT AN ELECTRONIC DEVICE," filed on Apr. 30, 2020, the entirety of which is incorporated herein by reference.

FIELD OF THE INVENTION

The present technology broadly relates to the field of information security; and, in particular, to methods and systems for detecting unauthorized bot activities at electronic devices.

BACKGROUND

Some unauthorized activities may be executed at a user's electronic device by smart bots. In the context of the present specification, a smart bot denotes a piece of soft- or hardware that is configured to execute a pre-determined activity on a website (web page) or on a smartphone, imitating human behavior.

One of examples of smart bots is a bot-scraper which is configured to automatically collect content, for example, information about the range of goods and their prices.

More specifically, web scraping is used for targeted search, as well as a component of developments used for web indexing, web mining and data mining, online monitoring of price changes and price comparison, for monitoring competition, collecting data that may be someone's property, including personal information (examples of the bot-scraper operation can be found at: hightech.fm/2018/08/02/scraper).

Resources to be protected from the activity of the bot scraper may include an e-commerce listing/selling platform of a chain store containing a large number of items, each having the fields "Name", "Product ID", "Price". Thus, competitors can use bot scrapers to obtain such information. However, such an e-commerce platform may not be interested in the information about its range of items and, for example, corresponding prices being automatically collected for the purposes of the competitors.

As nowadays such smart bots have significantly developed to disguise their activities well enough as coming from real users (see, for example, the bot at botzilla.ru), it therefore may be difficult to determine whether a given activity on a website is being executed by one of the smart bots or a human.

One of the prior art methods for detecting smart bots is based on the analysis of cookie files which are strings of data that are stored directly in the browser. They are a part of HTTP protocol defined by RFC 6265 specification. While browsing the website, a temporary cookie file is generated on the user device, in which, for example, an associated session identifier is stored, which may be used to exempt the user from having to re-enter their credentials when visiting another website.

More specifically, the prior art methods for detecting the smart bots, and bot scrapers, in particular, include the use of a cookie generated by the website upon starting a given session (that is, that generated when the user accessed the website for the first time), and subsequent verification for the presence of the cookie in all requests to subsequent websites.

However, smart bots may be configured to bypass such protection receiving the cookie generated during the first visit to the website (which is "seen" by the website as a visit by the user), and then substituting this cookie in all further requests to the website, further performed without a browser.

Certain prior art approaches have been proposed to address the above-identified technical problem.

U.S. Pat. No. 9,906,514-B1 issued on Feb. 27, 2018, assigned to Microsoft Technology Licensing LLC, and entitled "Resisting Anonymous Scraping" discloses a system, method, and apparatus for applying a technique for resisting or hindering scraping of a website or other repository of electronic data. When a connection from an entity is received at the website, if no signal or information is received that identifies the entity (e.g., a user identifier, a cookie), or the information is insufficient to discriminate the entity from other entities (e.g., an IP address that is or may be shared), one or more techniques are applied, such as: delaying loading of a page or page component, rendering a page (or page component) as an image, rendering only a portion of a page, applying a CAPTCHA, redirecting the entity to a login page, and/or others. Thus, an anti-scraping technique is activated for a connection from what could be a scraper that has purged its browser data of some or all identifying information.

U.S. Pat. No. 9,420,049-B1 issued on Aug. 16, 2016, assigned to F5 Networks Inc, and entitled "Client Side Human User Indicator" discloses a system and method for preventing web scraping which includes receiving a request between a web client and a web server for the web client to receive web content. A client side language script is injected into a response to be sent to the requesting web client, wherein the client side language script contains an event listener to detect a keystroke and/or a mouse movement at the web client. Information is collected from the client side language script relating to whether the keystroke and/or the mouse movement were detected. The web client is selectively allowed to access the web server to receive the web content based on the collected information.

U.S. Pat. No. 10,270,792-B1 issued on Apr. 23, 2019, assigned to F5 Networks Inc, and entitled "Methods for Detecting Malicious Smart Bots to Improve Network Security and Devices thereof" discloses methods, non-transitory computer readable media, security management apparatuses, and network traffic management systems that send a web page to a client device in response to a received request for a web resource. The web page comprises injected capability analysis client-side code that is configured to obtain and return capability data for a web browser identified in a user agent header of the request. A response comprising the returned capability data is received and the returned capability data is compared with expected capability data for the web browser identified in the user agent header of the request. A score is generated based at least in part on the comparison and a determination is made when the score exceeds an established threshold. The web resource is retrieved and provided to the client device, when the determining indicates that the score exceeds the

SUMMARY

It is an object of the present technology to ameliorate at least some of the inconveniences present in the prior art.

Broadly speaking, embodiments of the present technology are directed to systems and methods for detecting an activity of the smart bot (such as, the bot-scraper) at the website initiated from a user device. Further, the methods and systems provided herein enable to identify legitimate smart bots, that is those that are not intended to implement malicious activities on the website, such as the "crawler" by Google, a smart bot that indexes web pages on the Internet.

More specifically, the present methods and systems described herein are directed to generating, at the user device, a unique client cookie including a pre-generated flag indicative of whether the current user environment of the user device is associated with the user or the smart bot. According to certain non-limiting embodiments of the present technology, the pre-generated flag may be generated and transmitted to the user device in response to requests of a specifically configured Java Script Module (JSM) preinstalled in the browser application of the user device.

Thus, a proxy server associated with the targeted website may receive the unique client cookie, read the pre-generated flag, and make a corresponding decision whether to grant access to the website or decline.

More specifically, in accordance with a first broad aspect of the present technology, there is provided a method for detecting an unauthorized activity at a user device of a user. The method is executable by a server communicatively coupled, via a communication network, with the user device. The method comprises: analyzing, by the server, a first request for a first web page from the user device, the first request including an original client cookie data; in response to the original client cookie data associated with the first request meeting a predetermined cookie data threshold: causing the user device, to receive a preconfigured Java Script Module (JSM) for installation thereof in a browser application of the user device, thereby enabling the user device to generate a second request for the first web page, the second request being indicative of a given activity associated with the user device, by: receiving server cookie data indicative of the given activity being one of: a user activity of the user and a bot activity; generating the second request including first client cookie data and the server cookie data; receiving the second request from the user device the second request; determining if the second request is to be transmitted to a web content server associated with the first web page, such that: in response to the server cookie data being indicative of the user activity: the given activity associated with the user device is identified as being authorized; and the second request for the first web page is transmitted to the web content server for requesting access to the first web page; in response to the server cookie data being indicative of the bot activity: the given activity associated with the user device is identified as being unauthorized; and the second request for the first web page is blocked.

In some implementations of the method, the predetermined cookie data threshold is indicative of one of: the original client cookie data associated with the first request not corresponding to a predetermined cookie data format; and the original client cookie data having a null value.

In some implementations of the method, a version of the preconfigured JSM is associated with the user device.

In some implementations of the method, the server comprises a processing server and a proxy server, and wherein: said analyzing, causing, receiving, and determining are being executed by the proxy server; and the server cookie data has been generated by the processing server.

In some implementations of the method, the server cookie data has been generated by: causing, via the preconfigured JSM, the user device to retrieve user device data for transmission thereof to the processing server, the user device data being indicative of a current user environment associated with the user device at a moment of the generating the second request; receiving, form the user device, the user device data for analyzing thereof to determine if the given activity in respect of the first web page is indicative of one of the: the user activity of the user and the bot activity; generating the server cookie data including a result of the analyzing; transmitting, via the communication network, the server cookie data to the user device.

In some implementations of the method, the method further comprises encrypting, by the processing server, the server cookie data using one or more encryption algorithms.

In some implementations of the method, the one or more encryption algorithms includes at least one of: an AES 256 encryption algorithm, a Blowfish encryption algorithm, an SHA-256 encryption algorithm.

In some implementations of the method, the first client cookie data is single-use cookie data.

In some implementations of the method, the method further comprises: receiving, by the server, a third request for a second web page, the third request being indicative of an other activity associated with the user device, the third request having been generated by causing, by the server, via the preconfigured JSM, the user device to execute: receiving the server cookie data indicative of the given activity being one of: the user activity of the user and the bot activity; generating the third request including second client cookie data and the server cookie data; determining if the third request is to be transmitted to a web content server associated with the second web page, such that: in response to the server cookie data being indicative of the user activity: the third request for the second web page is transmitted to the web content server associated with the second web page for requesting access thereat to the second web page; in response to the server cookie data being indicative of the bot activity: the third request for the second web page is blocked.

In some implementations of the method, the second client cookie data is single-use cookie data.

In some implementations of the method, given subsequent client cookie data, generated by the user device, for a subsequent request is at least partially different from previous cookie data, generated by the user device, for a previous request.

In some implementations of the method, each one of the previous client cookie data and the subsequent client cookie data is assigned with a respective order number indicative of an order of generation thereof in time, and a respective activity associated with the user device is further determined as being associated with one of: the user activity and the bot activity, based on the respective order number.

In some implementations of the method, if the second request for the first web page is blocked, the method further comprises at least one of: redirecting the second request to a start page of the first web page; generating and display of an error message indicative of the given activity being associated with the bot activity; generating and display of a 404 code of the first web page; granting access to predetermined portions of the first web page associated with the unauthorized activity; storing an IP address associated with the user device in a database of malicious IP addresses.

In some implementations of the method, causing the receiving the server cookie is executed with a predetermined frequency.

In accordance with a second broad aspect of the present technology, there is provided a system for detecting an unauthorized activity at a user device of a user. The system comprises a server communicatively coupled, via a communication network, with the user device. The server comprises: a processor; and a non-transitory computer-readable medium comprising instructions. The processor, upon executing the instructions, is configured to: analyze a first request for a first web page from the user device, the first request including an original client cookie data; in response to the original client cookie data associated with the first request meeting a predetermined cookie data threshold: cause the user device, to receive a preconfigured Java Script Module (JSM) for installation thereof in a browser application of the user device, thereby enabling the user device to generate a second request for the first web page, the second request being indicative of a given activity associated with the user device, by: receiving server cookie data indicative of the given activity being one of: a user activity of the user and a bot activity; generating the second request including first client cookie data and the server cookie data; receive the second request from the user device the second request; determine if the second request is to be transmitted to a web content server associated with the first web page, such that: in response to the server cookie data being indicative of the user activity: the given activity associated with the user device is identified as being authorized; and the second request for the first web page is transmitted to the web content server for requesting access to the first web page; in response to the server cookie data being indicative of the bot activity: the given activity associated with the user device is identified as being unauthorized; and the second request for the first web page is blocked.

In some implementations of the system, the predetermined cookie data threshold is indicative of one of: the original client cookie data associated with the first request not corresponding to a predetermined cookie data format; and the original client cookie data having a null value.

In some implementations of the system, a version of the preconfigured JSM is associated with the user device.

In some implementations of the system, the server comprises a processing server and a proxy server, such that: said analyzing, causing, receiving, and determining are being executed by the proxy server; and the server cookie data has been generated by the processing server.

In some implementations of the system, in order to generate the server cookie data, the processing server is configured to: cause, via the preconfigured JSM, the user device to retrieve user device data for transmission thereof to the processing server, the user device data being indicative of a current user environment associated with the user device at a moment of the generating the second request; receive, form the user device, the user device data for analyzing thereof to determine if the given activity in respect of the first web page is indicative of one of the: the user activity of the user and the bot activity; generate the server cookie data including a result of the analyzing; transmit, via the communication network, the server cookie data to the user device.

In some implementations of the system, the processing server is further configured to encrypt the server cookie data using one or more encryption algorithms.

In some implementations of the system, the one or more encryption algorithms includes at least one of: an AES 256 encryption algorithm, a Blowfish encryption algorithm, an SHA-256 encryption algorithm.

In some implementations of the system, the first client cookie data is single-use cookie data.

In some implementations of the system, the processor is further configured to: receive a third request for a second web page, the third request being indicative of an other activity associated with the user device, the third request having been generated by causing the user device to execute: receiving the server cookie data indicative of the given activity being one of: the user activity of the user and the bot activity; generating the third request including second client cookie data and the server cookie data; determine if the third request is to be transmitted to a web content server associated with the second web page, such that: in response to the server cookie data being indicative of the user activity: the third request for the second web page is transmitted to the web content server associated with the second web page for requesting access thereat to the second web page; in response to the server cookie data being indicative of the bot activity: the third request for the second web page is blocked.

In some implementations of the system, the second client cookie data is single-use cookie data.

In some implementations of the system, given subsequent client cookie data, generated by the user device, for a subsequent request is at least partially different from previous cookie data, generated by the user device, for a previous request.

In some implementations of the system, each one of the previous client cookie data and the subsequent client cookie data is assigned with a respective order number indicative of an order of generation thereof in time, and a respective activity associated with the user device is further determined as being associated with one of: the user activity and the bot activity, based on the respective order number.

The system of claim 15, wherein if the second request for the first web page is denied by the web content server, the processor is further configured to execute at least one of: redirecting the second request to a start page of the first web page; generating and display of an error message indicative of the given activity being associated with the bot activity; generating and display of a 404 code of the first web page; granting access to predetermined portions of the first web page associated with the unauthorized activity; storing an IP address associated with the user device in a database of malicious IP addresses.

In the context of the present specification, unless expressly provided otherwise, a computer system may refer, but is not limited to, a "computing device", an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF DRAWINGS

Non-limiting embodiments of the present technology are described herein with reference to the accompanying drawings; these drawings are only presented to explain the essence of the technology and are not limiting the scope thereof in any way, where.

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

In some non-limiting embodiments of the present technology, there are provided a system and a method for detecting the unauthorized activity generated by a smart bot at a user device. In these embodiments, methods are used that enable to reliably determine the source of activity on the website (a legitimate/illegitimate smart bot or the user), as well as counteract malicious actions depending on the factors of a particular situation.

It is also worth noting that any component of the system for detecting malicious smart bots may alternatively be implemented or termed as a service, platform, or some other type of content.

System

Figure 1:
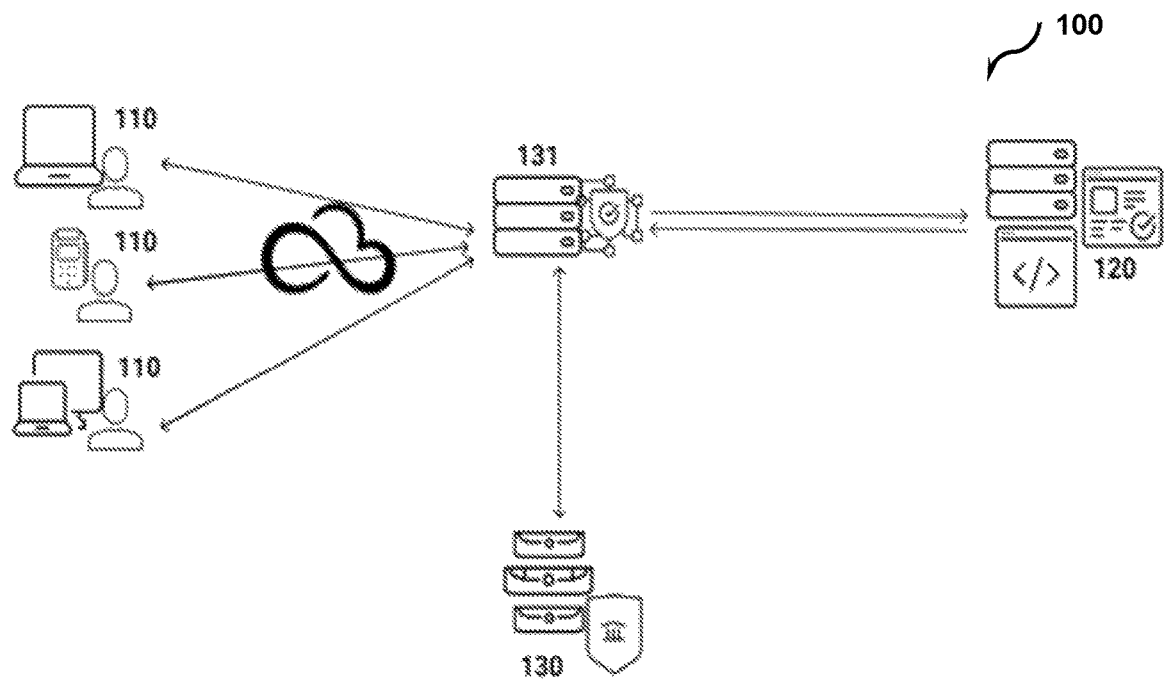
FIG. 1 depicts a schematic diagram of a system for detecting an unauthorized activity at a user device, in accordance with certain non-limiting embodiments of the present technology.

Referring initially to FIG. 1, there is depicted a first implementation of a system 100 for detecting unauthorized activity at a user device 110, in accordance with certain non-limiting embodiments of the present technology. In some non-limiting embodiments of the present technology, the system 100 may comprise a plurality of user devices 110 enabling the user associated therewith to browse websites and/or applications/services made available to them via a network. In some non-limiting embodiments of the present technology, the user device 110 may include stationary devices (e.g., a desktop computer, workstation, or IoT device) and/or mobile devices (e.g., a smartphone, tablet computer, laptop) to interact with client applications such as a browser or an application developed to access to a system/service.

Further, according to certain non-limiting embodiments of the present technology, the system 100 may further include a web server 120 that hosts at least one website to be protected. The web server 120 includes or has access to at least one storage of content elements or other information necessary to provide the website content to users or serves to process the website data. It is worth noting that the web server 120 can process millions of user connections/sessions, some of which can be generated by smart bots. Further, it should be noted that, according to various non-limiting embodiments of the present technology, the web server 120 may include a plurality of similarly implemented web servers.

Furthermore, it should be noted that implementations of the system 100 described herein may provide for effectively identifying both shell bots that make direct calls to an API of the web server 120, imitating a user activity of the user of the user device 110, and for detecting smarter bots that reproduce activities in the browser environment of the user device 110, such as PhantomJS, Selenium, etc., or hybrid versions of bots.

Figure 2:
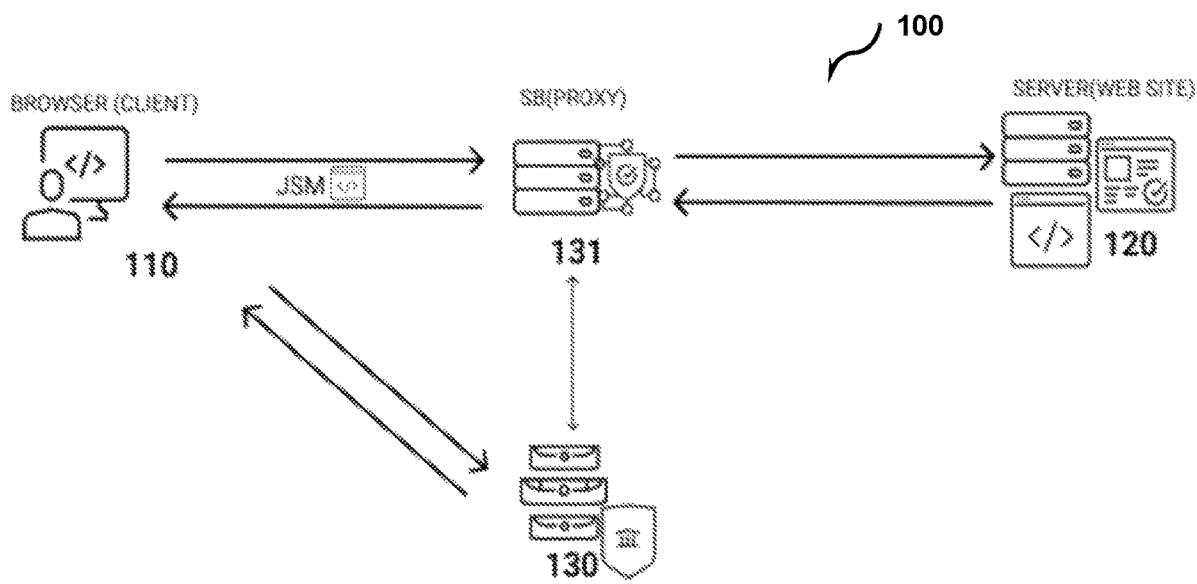
FIG. 2 depicts a schematic diagram of an implementation of the system of FIG. 1 including a proxy, in accordance with certain non-limiting embodiments of the present technology.
Figure 3:
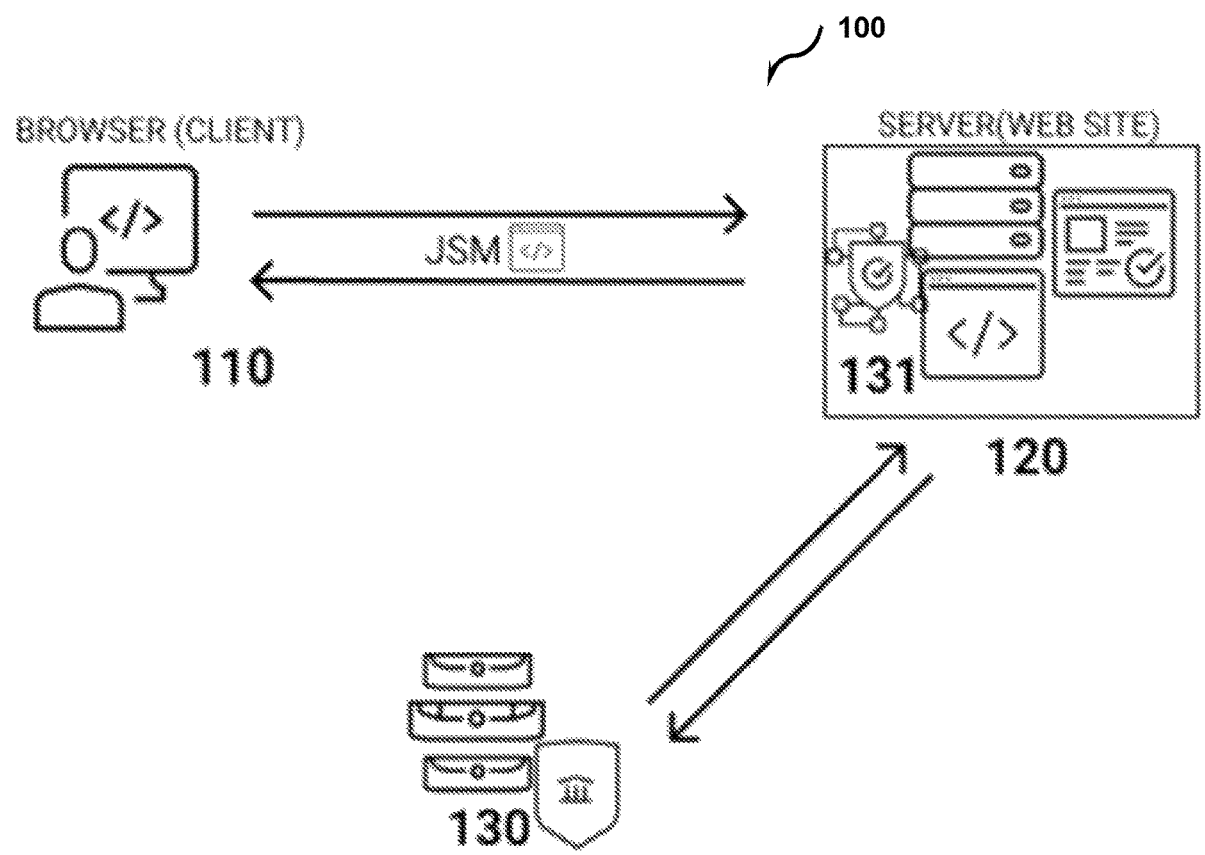
FIG. 3 depicts a schematic diagram of an other implementation of the system of FIG. 1, in accordance with certain non-limiting embodiments of the present technology.

Further, according to certain non-limiting embodiments of the present technology, the web server 120 may be coupled to at least one of a data analysis device 130 implemented as a backend server, and a proxy server 131 so as to enable verifying requests incoming to the web server 120 from the user device 110 to subsequently differentiate access to the website for smart bots and the user. It should be noted that the proxy server 131 is an access control device and can be implemented either as a separate physical device connected to the network, as depicted in FIG. 2, for example; or as a part of the web server 120, as depicted in FIG. 3, as an example; or a part of the data analysis device 130 (not separately depicted).

According to certain non-limiting embodiments of the present technology, each component of the system 100 may include one or more processors, a memory, and communication interface that are connected together by a bus or other communication channel—such as those of a computing environment 500 described below with reference to FIG. 5.

Further, according to some non-limiting embodiments of the present technology, each one of the web server 120, the data analysis device 130, and the proxy server 131 may be implemented as a conventional computer server. In one non-limiting example, each one of the web server 120, the data analysis device 130, and the proxy server 131 is implemented as a Dell™ PowerEdge™ Server running the Microsoft™ Windows Server™ operating system, but can also be implemented in any other suitable hardware, software, and/or firmware, or a combination thereof.

Further, each of the components of the system 100 may be communicatively coupled to each other either via direct channels (such as wired and wireless lines) or the network (not separately labelled). In some non-limiting embodiments of the present technology, the network is the Internet. In alternative non-limiting embodiments of the present technology, the network can be implemented as any suitable local area network (LAN), wide area network (WAN), a private communication network or the like. It should be expressly understood that implementations for the network are for illustration purposes only. How a respective communication link (not separately numbered) between each one of the user device 110, the web server 120, the data analysis device 130, and the proxy server 131 is implemented will depend, inter alia, on how each one of the user device 110, the web server 120, the data analysis device 130, and the proxy server 131 is implemented. Merely as an example and not as a limitation, in those embodiments of the present technology where the user device 110 is implemented as a wireless communication device such as a smartphone, the communication link can be implemented as a wireless communication link. Examples of wireless communication links include, but are not limited to, a 3G communication network link, a 4G communication network link, and the like.

Further, according to certain non-limiting embodiments of the present technology, each one the web server 120, the data analysis device 130, and the proxy server 131 may be configured to process requests received from user device 110 over the network, for example, in accordance with the RFC protocol of an HTTP-based application. Various applications can run on the web server 120 to transfer data (e.g., files or web pages) to the user device 110 through the proxy server 131 responsive to the requests from the user device 110.

Additionally, although each one the web server 120, the data analysis device 130, and the proxy server 131 are depicted as separate devices, it should be noted that execution of one or more actions of each of the web server 120, the data analysis device 130, and the proxy server 131 may be distributed thereamong. Further, each one of the web server 120, the data analysis device 130, and the proxy server 131 is not limited to a specific configuration. Thus, each one of the web server 120, the data analysis device 130, and the proxy server 131 may comprise a plurality of network computing devices that operate using a master/slave approach, whereby one of the network computing devices of a given one of the web server 120, the data analysis device 130, and the proxy server 131 can control and/or otherwise coordinate the operations of other network computing devices. The web server 120, the data analysis device 130, and the proxy server 131 can operate, for example, as a plurality of network computing devices in a cluster architecture, peer-to-peer architecture, virtual machines, or in a cloud architecture.

The functionality ascribed herein to a system may be distributed among its components in an alternative manner, such as by merging or further separating the functions of one or more components, or may be distributed among another set of components. In addition, while depicted as separate and distinct hardware components (e.g., computer servers) in FIG. 1, one or more users 110 and content web server(s) 120 may alternatively be implemented as separate program modules running on one or more computer servers. Thus, while only one embodiment of a particular system component may be illustrated in FIG. 1, it should be understood that other combinations of system components may be used.

Method

Figure 4:
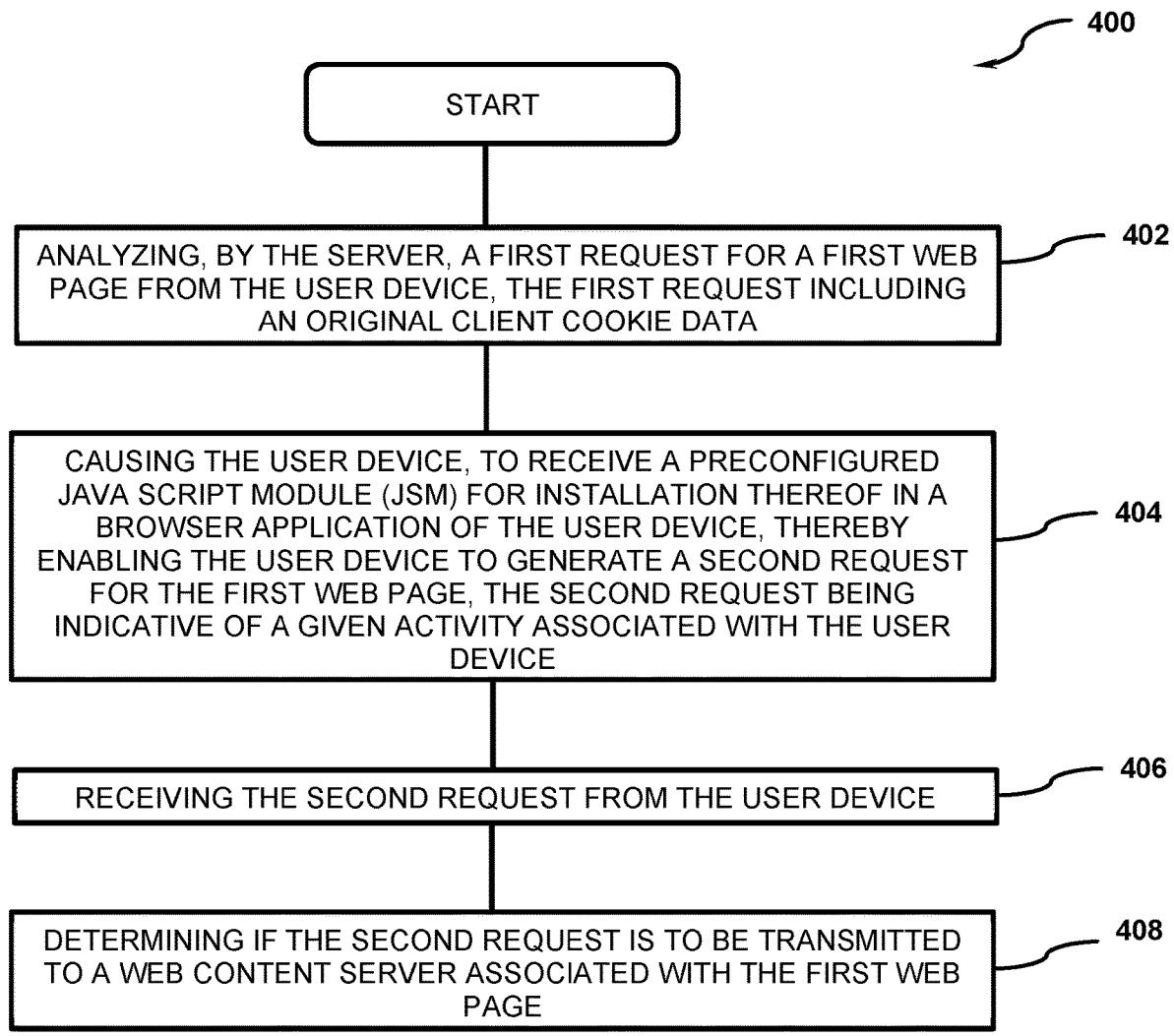
FIG. 4 depicts a flow diagram of a method for detecting the unauthorized activity at the user device, in accordance with certain non-limiting embodiments of the present technology.

Thus, with reference to FIG. 4, there is depicted a flowchart of a method 400 for detecting the unauthorized activity at the user device 110, in accordance with certain non-limiting embodiments of the present technology. In some non-limiting embodiments of the present technology, the method 400 may be executed by a processor 501 of one of the data analysis device 130 and the proxy server 131. It should be noted that, in other non-limiting embodiments of the present technology, one or more of the illustrated steps of the method 400 may be omitted, repeated, and/or performed in a different order. Accordingly, the arrangement of the steps depicted in FIG. 4 should not be construed as limiting the scope of the embodiments of the present technology.

Step 402: Analyzing, by the Server, a First Request Fora First Web Page from the User Device, the First Request Including an Original Client Cookie Data The method 400 commences at step 402 where the processor 501 can be configured to receive a first request for a first web page hosted by the web server 120. For example, the first request has been generated by the user device 110 and may include a Unique Resource Identifier (URI) of the first web page. Thus, the first request may further include original cookie data associated with the user device 110. For example, the original cookie data may have been previously stored on the user device 110 from a last user session. Further, upon the receipt of the first request, according to certain non-limiting embodiments of the present technology, the processor 501 may be configured to analyze the original cookie data.

Typically, in response to submitting the first request, such as by entering the URI of the first web page, the web server 120 may send a <Set-Cookie> HTTP header, so as to, for example, set the original cookie data with a special genuine session identifier of a current user session. On a next request to the web server 120, the browser of the user device 110 can be configured to send the <Cookie> HTTP header to the web server 120, which thus can further identify the user device 110. The original cookie data can also be accessed directly from the browser using the <document.cookie> property.

In additional non-limiting embodiments of the present technology, the processor 501 may be configured analyze the following parameters associated with the first request: whether the URI is included in the white list (static resources (pictures, js, etc.); a transfer address associated the original cookie data and an information address; a detect (that is, the request is recognized). Upon completion of the analysis, the processor 501 may be configured to make a decision, such that: if the analysis is successful, then the first request is transmitted to the web server 120, else the processor 501 may be configured to conduct an additional analysis of the first request.

Further, in some non-limiting embodiments of the present technology, the processor 501 may be configured to determine if the original cookie data meets a predetermined cookie data threshold. For example, the processor 501 may be configured to determine one of: if the original cookie data indicating the user requesting the first web corresponds to a predetermined cookie data format (i.e., if the original cookie data can be decoded); and if the original cookie data has a null value—that is, if the first request includes any cookie data at all.

It is worth noting that if the first request to does not any contain cookies, then it could have been generated both by the legitimate user of the user device 110 visiting the first web page for the first time (or who has deleted the identification information in their browser), or by a smart bot configured to imitate user activity.

Furthermore, in the context of the present specification, a request (such as the first request for the first web page) also means an AJAX request to receive data, perform any actions in which the page will not reload, as well as other actions in single-page web applications (Single Page Application, SPA), etc.

Thus, in some non-limiting embodiment of the present technology, in response to the original cookie data not meeting the predetermined cookie data threshold, the processor 501 may be configured to proceed to step 404 of the method.

Step 404: Causing the User Device, to Receive a Preconfigured Java Script Module (JSM) for Installation Thereof in a Browser Application of the User Device, Thereby Enabling the User Device to Generate a Second Request for the First Web Page, the Second Request being Indicative of a Given Activity Associated with the User Device At step 404, having determined that the client cookies are missing and/or invalid in the first request, the processor 501 may be configured to transmit, to the user device 110, a control page comprising a link to load a Java Script Module (JSM).

It is worth noting that the control page can be either a page with no content, or a welcome page for the first web page, or any other page that the first web page can provide responsive to the first request to load, without incurring significant harm.

Further, in some non-limiting embodiments of the present technology, the JSM can be pre-stored both on the web server 120 and on the data analysis device 130.

Further, in some non-limiting embodiments of the present technology, via the JSM, the processor 501 can be configured to obtain information about the browser, about support for certain APIs, HTML5 or CSS functions, etc. of the user device 110 representative of a current user environment associated therewith. More specifically, according to certain non-limiting embodiments of the present technology, the information representative of the current user environment may non-exhaustively include at least one of: (1) information of a version of an operating system run on the user device 110, and of other applications installed thereon, such as the browser and browser extensions installed therein, as an example; (2) information of how a system clock associated with the user device 110 operates; (3) information of a central processing unit (CPU) and a graphics processing unit (GPU) of the user device 110; (4) data indicative of screen parameters of the user device 110; (5) a list of plug-ins installed on the user device 110, such as ActiveX, Browser Helper objects, and the like; and (6) data indicative of mouse movements over the screen of the user device 110.

It is worth noting that the JSM may be configured to update client cookie data on every AJAX request from the user device 110.

Further, according to certain non-limiting embodiments of the present technology, the processor 501 may be configured to receive, from the user device 110, the data indicative of the current user environment associated with the user device 110, and analyze it to determine if a current activity associated with the user device is indicative of one of: the user activity of the user and a bot activity of the smart bot emulating the user activity.

It should be noted here that the processor 501 may have access to a database that stores records of standard characteristics for different types and/or versions of web browsers (e.g., based on a user agent). For example, Google Chrome supports CSS scaling, pointer events, input method editors, pointer events and input method editor API, vibration API, Anchor API, but does not support gamepad API, Push API. Further, in some non-limiting embodiment of the present technology, the processor 501 may be configured to retrieve data of the standard characteristics from a third-party source available via the network.

By so doing, the processor 501 may be configured to compare the characteristics retrieved from the database or the third-party source with the data indicative of the user environment retrieved from the user device 110. Also, the processor 501 may be configured to add the traffic information to the <header> of user info being transferred.

It should be noted that the JSM, after being executed in the browser of the user device 110, may be configured to send requests to the processor 501. Such requests can be sent no less frequently than a predetermined period <alive timeout>, for example, about 45 seconds.

Thus, having analyzed the data indicative of the current user environment associated with the user device 110, the processor 501 may be configured to determine if the current activity associated with the user device 110 is indicative of one of the user activity and the bot activity, and generate a server cookie data including a result of the determination. The processor 501 may further be configured to transmit the server cookie data to the user device 110.

It should be noted that, in some non-limiting embodiments of the present technology, the processor 501 may be configured to generate the server cookie data each time a request thereto is sent. In some non-limiting embodiments of the present technology, the processor 501 may be configured to encrypt the server cookie data using an encryption algorithm, which may prevent the former from being forged and viewed on the user device 110, for example, by the smart bot. In some non-limiting embodiments of the present technology, the encryption algorithm may include at least one of: an AES 256 encryption algorithm, a Blowfish encryption algorithm, an SHA-256 encryption algorithm.

Thus, according to certain non-limiting embodiments of the present technology, the server cookie data may include a timestamp of generation thereof and the result of the analysis of the data indicative of the current user environment associated with the user device 110. Further, the result of the analysis may include an instruction, for example, for the proxy server 131, on the further actions, such as to block a respective request not, and if so, why.

Upon transmitting the server cookie data to the user device 110, the processor 501 may be configured to cause, via the JSM, the user device 110 to generate a second request for the first web page hosted on the web server 120. The second request may thus include first client cookie data associated with the user device 110 and the server cookie data including the instruction on whether to transmit the second request to the web server for providing access to providing access to the first web page at the user device 110; or to block the second request.

Further, it should be noted that the request to obtain the server cookie data (and the transfer of the necessary information about the user environment) is associated with a URI that is pre-included in the "white list"; and thus is always passed.

In some non-limiting embodiments of the present technology, the processor 501 may be configured to cause the user device 110 to generate the first client cookie data using a counter that will enable to generate an ordered sequence of generation of client cookie data so as to exclude cases in which the smart bot can learn to generate the necessary cookie data to overcome the protection algorithm. Thus, single-use client cookie data is generated for each request including an incremental identifier—such as an order number of generation thereof by the user device 110. Thus, for example, if the proxy server 131 receives client cookie data with id=n, and further other client cookie data having id<n, then even if this single-use cookie data has never been used yet, it will still be considered expired. The described filtering process may prevent from generating and sending parallel requests, even if the generation algorithm becomes known to the smart bot.

Furthermore, it should be noted that, in some non-limiting embodiments of the present technology, to mitigate the risks of the bot activity in case of the algorithm of generating the client cookie data becomes known to the smart bot, the JSM can be generated dynamically, that is, a different version of the JSM is pre-determined for a respective user device of the user, whereby the proxy server 131 is configured to determine if a given request includes client cookie data having been generated by the JSM of a version associated with a respective user device. This approach may enable to avoid scaling the attack by reverse engineering the JSM.

It should be noted that the any client cookie data, such as the first client cookie data is a single-use cookie data. Furthermore, it should be noted that the client cookie data is updated every time a request for a web page is sent by the user device 110 to the web server 120, which may include page uploading, page downloading, and any AJAX requests, as an example.

Thus, the second request including the first client cookie data and the server cookie data may be sent, by the user device 110, to the web server 120. As it can be appreciated from one of the implementations of the system 100 depicted in FIGS. 1 to 3, the second request, before being received by the web server 120, may be received by the proxy server 131.

It should be noted that, in some non-limiting embodiments of the present technology at least step 404 may be executed on the device analysis device 130, while other steps including the following steps 406 and 408 may be executed on the proxy server 131. To that end, as mentioned above, the proxy server 131, like the data analysis device 130, may include any component of the computing environment 500 which will be described below with reference to FIG. 5.

The method 400 thus proceeds to step 406.

Step 406: Receiving the Second Request from the User Device

At step 406, the processor 501 may be configured to receive the second request from the user device 110. Additionally, the processor 501 may be configured to decrypt the server cookie data and, based on the result of the analysis rendered at the data analysis device 130, to make a decision whether to transmit the second request to web server 120 or block it.

The method 400 thus advances to step 408.

Step 408: Determining if the Second Request is to be Transmitted to a Web Content Server Associated with the First Web Page At step 408, based on the result of the analysis rendered at the data analysis device 130, the processor 501 may be configured to determine if the second request should be transmitted to the web server 120 or not. More specifically, in response to the server cookie data being indicative of the user activity, the processor 501 may be configured to identify the given activity associated with the user device 110 as being authorized, and transmit the second request for the first web page to the web server 120 for requesting access to the first web page. By contrast, in response to the server cookie data being indicative of the bot activity of the smart bot, the processor 501 may be configured to identify the given activity associated with the user device 10 as being unauthorized, and block the second request for the first web page.

In some non-limiting embodiments of the present technology, further to blocking the second request, the processor 501 may be configured to execute a least one of: redirecting the second request to a start page of the first web page; generating and display of an error message indicative of the given activity being associated with the bot activity; generating and display of a 404 code of the first web page; granting access to predetermined portions of the first web page associated with the unauthorized activity; storing an IP address associated with the user device in a database of malicious IP addresses.

Further, in some non-limiting embodiments of the present technology, the processor 501 may be configured to generate "white lists" including IP addresses and/or requests that should be passed to the web server 120 under any circumstances.

Further, in some non-limiting embodiments of the present technology, by executing the method described above, the processor 501 may be configured to provide protection to specific web page(s) of a web resource, and/or the protection of specific elements of the web page from the smart bot.

Thus, certain embodiments of the method 400 are directed to detecting activities of malicious smart bots preventing them from replacing cookie data files on the user device 110.

When the processor 501 receives an other request from the browser of the user device 110 to load an other web page, the other request may have been generated by one of: (a) the user clicking on a link on an page being displayed on their side, or (b) the smart bot generating the other request including one or both of the previously received cookies.

In case of (a), the following takes place. In response to the other request to load the other web page, the processor 501 may be configured to: cause generating, via the JSM on the user device 110, second client cookie data; transmitting, by the browser of the user device 110, the other request to load the other web page including the second client cookie data and the server cookie data; determining presence of the server cookie data and the second client cookie data, wherein if the result of analyzing the data indicative of the current user environment associated with the user device 110 is indicative of the user activity of the user, the processor 501 may then be configured to transmit the other request to an associated web server (such as the web server 120) hosting the other web page for providing access to the user device 110 to the other web page.

It should be noted that the second client cookie data may also be single-use cookie data and generated similar to the first client cookie data described above.

In case of (b), according to certain non-limiting embodiments of the present technology, the processor 501 may be configured to: cause transmitting the other request to load the other web page, the request including the first and/or second client cookie data; determining the presence of the server cookie data and second client cookie data, wherein if the result of analyzing the data indicative of the current user environment associated with the user device 110, rendered by the data analysis device 130, is indicative of the bot activity of the smart bot, the processor 501 may then be configured to block the other request.

In some non-limiting embodiments of the present technology, the processor 501 may be configured to execute the steps of the method 400 described above occur iteratively, as long as requests for new web pages are generated at the user device 110. Therefore, it should be noted that the server cookie data may be changed over time to include results of analysis of data associated with the user environment for detecting more smart bots that may use the browser of the user device 110 and are able to simulate the user activity of the user.

Thus, the smart bot will not be able to retrieve the content of a large number of new web pages simply by sending appropriate requests with any set of previously obtained cookies. By contrast, in order to gain access to new pages, the browser of the user device 110 can be running the JSM previously installed therein.

It should be noted that in some non-limiting embodiments of the present technology, the processor 501 can be configured to generate and cause display of a report on system events, which may include, for example, the following data: date, time, event name, type of activity (bot/user), if a bot, then why, etc.

The method 400 thus terminates.

Computing Environment

Figure 5:
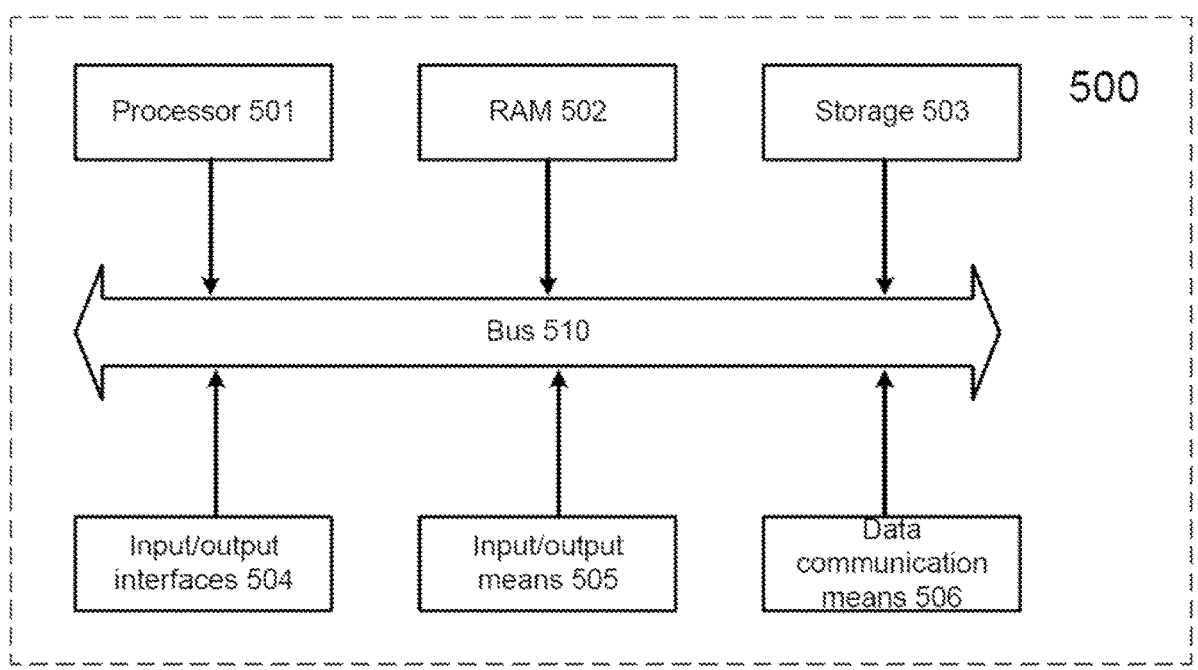
FIG. 5 depicts a schematic diagram of an example computing environment configurable for execution the method of FIG. 4, in accordance with certain non-limiting embodiments of the present technology.

With reference to FIG. 5, there is depicted an example functional diagram of the computing environment 500 configurable to implement certain non-limiting embodiments of the present technology including the method 400 described above.

In some non-limiting embodiments of the present technology, the computing environment 500 may include: the processor 501 comprising one or more central processing units (CPUs), at least one non-transitory computer-readable memory 502 (RAM), a storage 503, input/output interfaces 504, input/output means 505, data communication means 506.

According to some non-limiting embodiments of the present technology, the processor 501 may be configured to execute specific program instructions the computations as required for the computing environment 500 to function properly or to ensure the functioning of one or more of its components. The processor 501 may further be configured to execute specific machine-readable instructions stored in the at least one non-transitory computer-readable memory 502, for example, those causing the computing environment 500 to execute the method 400.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 502 may be implemented as RAM and contains the necessary program logic to provide the requisite functionality.

The storage 503 may be implemented as at least one of an HDD drive, an SSD drive, a RAID array, a network storage, a flash memory, an optical drive (such as CD, DVD, MD, Blu-ray), etc. The storage 503 may be configured for long-term storage of various data, e.g., the aforementioned documents with user data sets, databases with the time intervals measured for each user, user IDs, etc.

The input/output interfaces 504 may comprise various interfaces, such as at least one of USB, RS232, RJ45, LPT, COM, HDMI, PS/2, Lightning, FireWire, etc.

The input/output means 505 may include at least one of a keyboard, joystick, (touchscreen) display, projector, touchpad, mouse, trackball, stylus, speakers, microphone, and the like. A communication link between each one of the input/output means 505 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 506 may be selected based on a particular implementation of the network, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 504 may be configured for wired and wireless data transmission, via one of WAN, PAN, LAN, Intranet, Internet, WLAN, WMAN, or GSM networks.

These and other components of the computing environment 500 may be linked together using a common data bus 510.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for detecting an unauthorized activity at a user device of a user, the method being executable by a server communicatively coupled, via a communication network, with the user device, the method comprising:
   analyzing, by the server, a first request for a first web page from the user device, the first request including an original client cookie data;
   in response to the original client cookie data associated with the first request meeting a predetermined cookie data threshold:
      causing the user device, to receive a preconfigured Java Script Module (JSM) for installation thereof in a browser application of the user device, thereby enabling the user device to generate a second request for the first web page, the second request being indicative of a given activity associated with the user device, by:
         receiving server cookie data indicative of the given activity being one of: a user activity of the user and a bot activity;
         generating the second request including first client cookie data and the server cookie data;
   receiving the second request from the user device;
   determining if the second request is to be transmitted to a web content server associated with the first web page, such that:
      in response to the server cookie data being indicative of the user activity:
         the given activity associated with the user device is identified as being authorized; and
         the second request for the first web page is transmitted to the web content server for requesting access to the first web page;
      in response to the server cookie data being indicative of the bot activity:

the given activity associated with the user device is identified as being unauthorized; and the second request for the first web page is blocked.

2. The method of claim 1, wherein the predetermined cookie data threshold is indicative of one of:
- the original client cookie data associated with the first request not corresponding to a predetermined cookie data format; and
- the original client cookie data having a null value.

3. The method of claim 1, wherein a version of the preconfigured JSM is associated with the user device.

4. The method of claim 1, wherein the server comprises a processing server and a proxy server, and wherein:
- said analyzing, causing, receiving, and determining are being executed by the proxy server; and
- the server cookie data has been generated by the processing server.

5. The method of claim 4, wherein the server cookie data has been generated by:
- causing, via the preconfigured JSM, the user device to retrieve user device data for transmission thereof to the processing server, the user device data being indicative of a current user environment associated with the user device at a moment of the generating the second request;
- receiving, form the user device, the user device data for analyzing thereof to determine if the given activity in respect of the first web page is indicative of one of the: the user activity of the user and the bot activity;
- generating the server cookie data including a result of the analyzing;
- transmitting, via the communication network, the server cookie data to the user device.

6. The method of claim 5, further comprising encrypting, by the processing server, the server cookie data using one or more encryption algorithms.

7. The method of claim 6, wherein the one or more encryption algorithms includes at least one of: an AES 256 encryption algorithm, a Blowfish encryption algorithm, an SHA-256 encryption algorithm.

8. The method of claim 1, wherein the first client cookie data is single-use cookie data.

9. The method of claim 1, further comprising:
- receiving, by the server, a third request for a second web page, the third request being indicative of an other activity associated with the user device, the third request having been generated by causing, by the server, via the preconfigured JSM, the user device to execute:
  - receiving the server cookie data indicative of the given activity being one of: the user activity of the user and the bot activity;
  - generating the third request including second client cookie data and the server cookie data;
  - determining if the third request is to be transmitted to a web content server associated with the second web page, such that:
    - in response to the server cookie data being indicative of the user activity:
      - the third request for the second web page is transmitted to the web content server associated with the second web page for requesting access thereat to the second web page;
    - in response to the server cookie data being indicative of the bot activity:
      - the third request for the second web page is blocked.

10. The method of claim 9, wherein the second client cookie data is single-use cookie data.

11. The method of claim 1, wherein given subsequent client cookie data, generated by the user device, for a subsequent request is at least partially different from previous cookie data, generated by the user device, for a previous request.

12. The method of claim 11, wherein each one of the previous client cookie data and the subsequent client cookie data is assigned with a respective order number indicative of an order of generation thereof in time, and a respective activity associated with the user device is further determined as being associated with one of: the user activity and the bot activity, based on the respective order number.

13. The method of claim 1, wherein if the second request for the first web page is blocked, the method further comprises at least one of: redirecting the second request to a start page of the first web page; generating and display of an error message indicative of the given activity being associated with the bot activity; generating and display of a 404 code of the first web page; granting access to predetermined portions of the first web page associated with the unauthorized activity; storing an IP address associated with the user device in a database of malicious IP addresses.

14. The method of claim 1, wherein causing the receiving the server cookie is executed with a predetermined frequency.

15. A system for detecting an unauthorized activity at a user device of a user, the system comprising a server communicatively coupled, via a communication network, with the user device, the server comprising:
- a processor;
- a non-transitory computer-readable medium comprising instructions;
- the processor, upon executing the instructions, being configured to:
  - analyze a first request for a first web page from the user device, the first request including an original client cookie data;
  - in response to the original client cookie data associated with the first request meeting a predetermined cookie data threshold:
    - cause the user device, to receive a preconfigured Java Script Module (JSM) for installation thereof in a browser application of the user device, thereby enabling the user device to generate a second request for the first web page, the second request being indicative of a given activity associated with the user device, by:
      - receiving server cookie data indicative of the given activity being one of: a user activity of the user and a bot activity;
      - generating the second request including first client cookie data and the server cookie data;
  - receive the second request from the user device;
  - determine if the second request is to be transmitted to a web content server associated with the first web page, such that:
    - in response to the server cookie data being indicative of the user activity:
      - the given activity associated with the user device is identified as being authorized; and
      - the second request for the first web page is transmitted to the web content server for requesting access to the first web page;
    - in response to the server cookie data being indicative of the bot activity:

the given activity associated with the user device is identified as being unauthorized; and the second request for the first web page is blocked.

16. The system of claim 15, wherein the predetermined cookie data threshold is indicative of one of:

the original client cookie data associated with the first request not corresponding to a predetermined cookie data format; and the original client cookie data having a null value.

17. The system of claim 15, wherein a version of the preconfigured JSM is associated with the user device.

18. The system of claim 15, wherein the server comprises a processing server and a proxy server, such that:

said analyzing, causing, receiving, and determining are being executed by the proxy server; and the server cookie data has been generated by the processing server.

19. The system of claim 18, wherein in order to generate the server cookie data, the processing server is configured to:

cause, via the preconfigured JSM, the user device to retrieve user device data for transmission thereof to the processing server, the user device data being indicative of a current user environment associated with the user device at a moment of the generating the second request;

receive, form the user device, the user device data for analyzing thereof to determine if the given activity in respect of the first web page is indicative of one of the: the user activity of the user and the bot activity;

generate the server cookie data including a result of the analyzing;

transmit, via the communication network, the server cookie data to the user device.

20. The system of claim 19, wherein the processing server is further configured to encrypt the server cookie data using one or more encryption algorithms.

21. The system of claim 20, wherein the one or more encryption algorithms includes at least one of: an AES 256 encryption algorithm, a Blowfish encryption algorithm, an SHA-256 encryption algorithm.

22. The system of claim 15, wherein the first client cookie data is single-use cookie data.

23. The system of claim 15, wherein the processor is further configured to:

receive a third request for a second web page, the third request being indicative of an other activity associated with the user device, the third request having been generated by causing the user device to execute:

receiving the server cookie data indicative of the given activity being one of: the user activity of the user and the bot activity;

generating the third request including second client cookie data and the server cookie data;

determine if the third request is to be transmitted to a web content server associated with the second web page, such that:

in response to the server cookie data being indicative of the user activity:

the third request for the second web page is transmitted to the web content server associated with the second web page for requesting access thereat to the second web page;

in response to the server cookie data being indicative of the bot activity:

the third request for the second web page is blocked.

24. The system of claim 23, wherein the second client cookie data is single-use cookie data.

25. The system of claim 15, wherein given subsequent client cookie data, generated by the user device, for a subsequent request is at least partially different from previous cookie data, generated by the user device, for a previous request.

26. The system of claim 25, wherein each one of the previous client cookie data and the subsequent client cookie data is assigned with a respective order number indicative of an order of generation thereof in time, and a respective activity associated with the user device is further determined as being associated with one of: the user activity and the bot activity, based on the respective order number.

27. The system of claim 15, wherein if the second request for the first web page is blocked, the processor is further configured to execute at least one of: redirecting the second request to a start page of the first web page; generating and display of an error message indicative of the given activity being associated with the bot activity; generating and display of a 404 code of the first web page; granting access to predetermined portions of the first web page associated with the unauthorized activity; storing an IP address associated with the user device in a database of malicious IP addresses.

* * * * *